Patented Feb. 5, 1946

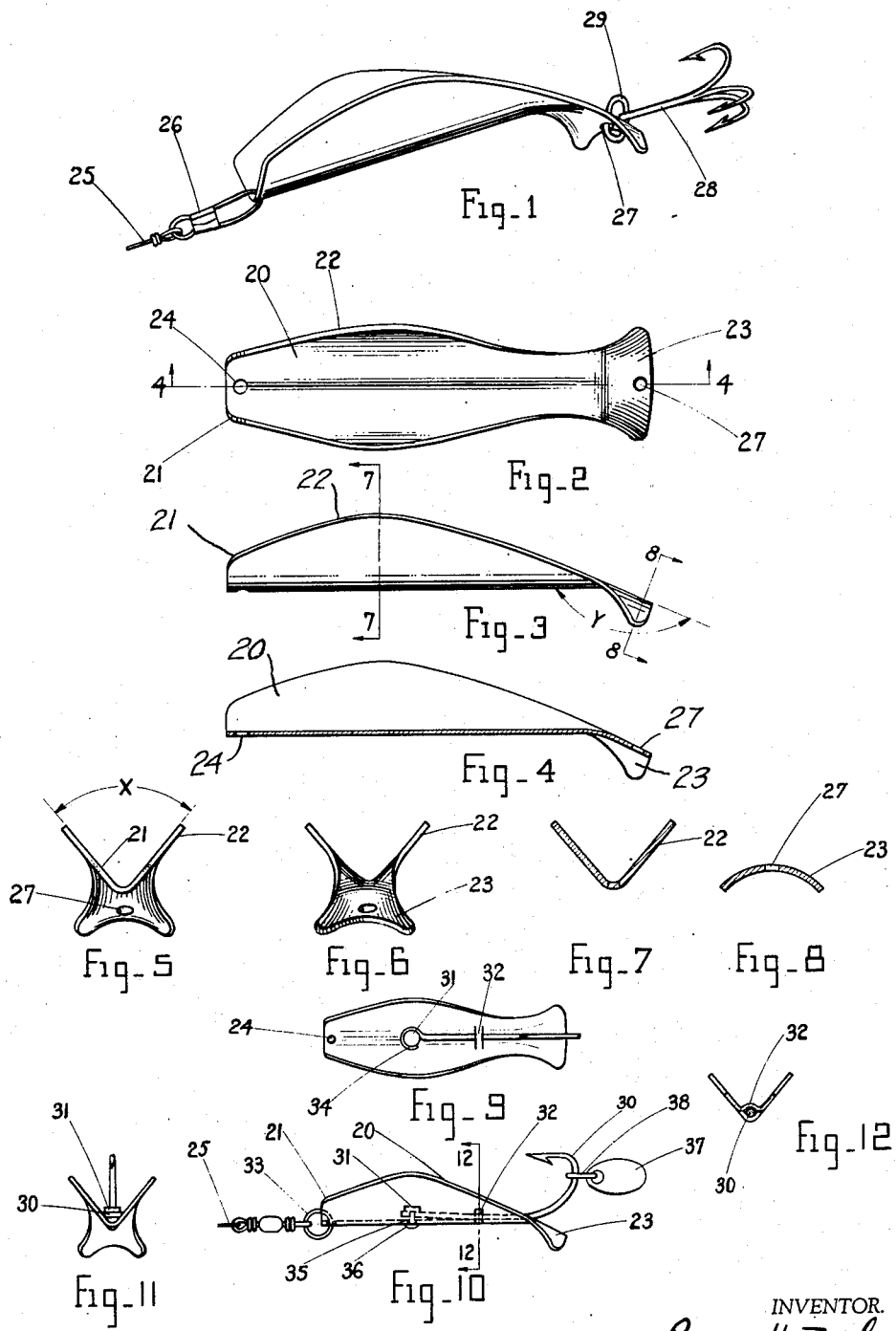

2,394,132

UNITED STATES PATENT OFFICE 2,394,132

FISH LURE

Bruno Henry Zeibig, Fenton, Mich.

Application November 25, 1940, Serial No. 366,982

1 Claim. (Cl. 43—42)

The present invention relates to a fish lure for casting, trolling and, when of small size, for fly rod casting.

The particular object of the invention is to provide a new type of lure which has a new and distinctive action in the water, imitating more effectively a fish, in both appearance and more particularly in action, than the nonfloating lures found in the prior art and therefore particularly attractive to game fish.

This novel design of fish lure is, in its principle as well as in its details, the result of experience and of many exhaustive tests conducted to obtain the very desirable results claimed for it.

The purpose of the invention is to design a fish lure which, at a wide range of the usual or proper trolling speeds will travel in a sinuous path with a controlled wabbling and rocking movement about a longitudinal axis coordinated with a lateral oscillating motion about a center which is the point where the lure is fastened to the leader or line.

The invention has also for an object to provide a lure which will travel at an even depth thus preventing it to raise from the water when in action, which will not turn over or spin and which if, when cast, it strikes the water upside down will immediately right itself and stay in that position during the complete trip through the water.

Another object of the invention is to provide a lure whose form and action will present a large and swiftly moving reflecting surface to the light rays as it is pulled through the water, thus making it very attractive to fish.

A still further object of the invention is to provide a new method of guiding and securing a hook in place on a lure body.

These and other objects and advantages are secured by the new lure construction which is illustrated in the accompanying drawing and described in the following specification.

The preferred forms of the invention are illustrated in the accompanying drawing, and the particular features thereof are particularly pointed out, in the concluding claim.

In the drawing:

Figure 1 is a perspective view of the fish lure in its swimming position.

Figure 2 is a top plan view thereof without the snap and hook shown in Figure 1.

Figure 3 is a side elevation of the lure without the snap and hook shown in Figure 1.

Figure 4 is a longitudinal section taken along the line 4—4 of Figure 2.

Figure 5 is a front end view of the lure.

Figure 6 is a rear end view thereof.

Figure 7 is a transverse section taken along the line 7—7 of Figure 3.

Figure 8 is a transverse section taken along the line 8—8 of Figure 3.

Figure 9 is a top plan view of another form of the invention better adapted for small size lures, such as are used for fly rod casting.

Figure 10 is a side elevation thereof with a swivel and additional lure attached to it.

Figure 11 is a front end view of same.

Figure 12 is a transverse section taken along the line 12—12 of Figure 10.

Referring to the drawing the numeral 20 indicates a sheet metal body comprising a head or forward portion 21, an intermediate portion 22 and a tail or rear portion 23. The body is of trough shaped section preferably a continuous straight V shaped section throughout said head and intermediate portions up to the start of the tail 23, the top side of which is convex and downwardly inclined. The sides of the V shaped section are flat in both directions except at the extreme rear end of the intermediate portion where they are shaped to merge smoothly into the downwardly inclined convex tail. The angular disposition of the surfaces of the body, the long straight and flat sides of the V shaped head and intermediate portions, the shallow, open, plain head and the wide, convex downwardly inclined tail contribute to the particular motion of the lure at a uniform level in the water and at any ordinary trolling speeds. These surfaces also prevent the lure from turning over and cause same to have well controlled wabbling, rocking and oscillating movements along a sinuous path. The lure wiggles through the water like a small fish.

The V shaped section which is shallow at the head or forward portion 21 deepens rapidly until it reaches a maximum at the approximate center of the intermediate portion 22 and decreases slowly until it reaches a point near the tail 23 where said V section flares to merge smoothly with the tail. The tail then becomes convex, which convexity increases to a maximum at the rear extremity, and is inclined downwardly. The sides of the V shaped combined head and intermediate portions preferably form an acute angle X. This acute angle X contributes to the best performance of the lure when it has a value of from seventy five degrees (75°) to eighty five degrees (85°). The general inclination of the downwardly bent tail portion to the bottom of the head and intermediate portions of the lure is an obtuse angle Y. The obtuse angle Y contributes to the best performance of the lure when it has a value of from hundred forty five degrees (145°) to hundred fifty five degrees (155°).

The tail which is narrowest, adjacent to the V shaped portion increases rapidly in width until it reaches a size comparable to the width of the intermediate portion, being approximately from three-quarters (¾) to seven-eighths (⅞) the width of said V shaped intermediate portion. The width of the head portion is approximately equal to the narrowest width of the tail. The length of the tail is approximately from one-sixth (⅙) to one-fourth (¼) of the total length of body 20. The height of the forward extremity of the head portion 21 is approximately half (½) the maximum height of the intermediate portion 22. The body is narrowest at the head 21, then widens to a maximum at the intermediate portion 22 where the V section is the highest and decreases in width up to the start of the tail; the tail, then increases in width to reach a maximum at its rear extremity. The width of the tail at its rear extremity is approximately one-quarter (¼) of the total length of the body. The ends of both the head and the tail are rounded off as well as the bottom of the V shaped portion principally for the sake of appearance. These proportions given to the various portions of the lure for obtaining a movement imitating well the motion of a fish swimming in the water also give the lure a streamlined appearance and a better imitation of the shape of a fish than that obtained by already known non floating lures such as those commonly known as spoons.

The forward portion or head 21 of body 20 has an opening 24 to which a line 25 is secured by means of a snap 26. This securing means 26 may be replaced by a split ring, snap swivel or any suitable linkage without affecting the movement of the lure. The rear portion or tail 23 has an opening 27 to which a hook 28 is secured by means of a split ring 29 or like securing means.

My lure such as described above may be made in various sizes as commonly used for different types of fishing. However, for the smaller sizes and particularly for those suitable for fly rod casting I have provided my lure with a single hook 30 which is securely fastened inside of the V shaped portion, preferably by means of a rivet 31 or other suitable means. In order that the hook would reinforce the lure and would be prevented from being turned or lifted, in the case of rough handling such as when a very well hooked fish is removed from the lure, I have provided a loop 32 punched inwardly out of the bottom of the V shaped portion of the body 20 at a point between the rivet 31 and the tail 23. To position and fasten the hook 30 in place, the eye 34 of the hook, which is opened slightly to make this possible, is passed between the loop 32 and the body; the hook is then pushed forward until the eye 34 is over the opening 35 provided in the bottom of the V shaped portion at a point between the head and the loop 32; then, the rivet 31 is slipped through both the eye 34 and the opening 35 and is finally peened over at 36.

The head 21 is provided with an opening 24 through which the line 25 is secured by means of any suitable linkage 26 preferably a combination split ring and swivel 33.

Although this lure, such as described in the foregoing description is very attractive and is very efficient in its purpose, its attractiveness to game fish may be further enhanced by attaching to the hook 30 an additional lure such as a small polished or plated metal flipper or spinner 37 either directly or through the medium of a ring or any suitable linkage 38.

This lure as previously disclosed in this description is preferably made of sheet metal by the usual stamping and forming methods and can be finished in a number of ways. For instance when made of Monel metal, brass, stainless steel, copper, nickel-silver, phosphor bronze, aluminum, etc., it can be simply polished and lacquered. It can also be made of sheet steel or of any suitable die cast material; in the latter case an appropriate mold is made to produce the lure. The lure can also be finished by electroplating with various metals or can be painted or enameled as desired. An electroplated bright finish or a polished metal finish is very attractive, and seems to reflect better the light rays in the water. Of course various finishes are required to meet the various fishing conditions.

The particular action of the lure that I have described in the foregoing description and illustrated in the accompanying drawing is the result of the following features; a very wide convex short tail inclined downwardly and rearwardly at the rear of a long combined head and intermediate portions having a continuous deep V shaped section; the open head which is plain being devoid of downturned deflector such as found on many lures, allows for a more free and lively motion through the water even at rather very slow trolling speeds. The motions produced by the wide tail through the water are controlled by the long combined V shaped head and intermediate portions. The downwardly inclined wide tail also causes the lure to travel at an even depth thus preventing it to rise from the water and the V shaped portion also prevents the lure from turning over or spinning.

The drawing shows the preferred forms of the lure in its proper proportions.

Modifications may be resorted to without departing from the spirit of the invention or the scope of the appended claim which is not limited to the specific construction shown and described. Other objects and advantages will be apparent to those skilled in this art.

Having thus fully described my invention, what I claim as new and desire to secure by Letters Patent is:

A fish lure having a body comprising a head and intermediate portions forming a continuous straight-bottomed V-shaped section, the sides of the body being flat in both directions and of gradually decreasing depth from about the middle of the body to the head and the other end of the body, and a convex tail which merges directly and smoothly into the end of the body distant from the head and is continuously inclined downwardly from its junction therewith, the convexity of said tail increasing gradually toward the rear extremity of same.

BRUNO HENRY ZEIBIG.